Sept. 9, 1969       J. R. SIMPSON                3,466,241
            BIOLOGICAL TREATMENT OF WASTE WATER
                CONTAINING ORGANIC MATTER
Filed Dec. 27, 1967                        2 Sheets-Sheet 2

United States Patent Office 3,466,241
Patented Sept. 9, 1969

3,466,241
BIOLOGICAL TREATMENT OF WASTE WATER CONTAINING ORGANIC MATTER
James Roxby Simpson, Stocksfield, England, assignor to National Research Development Corporation, London, England, a British corporation
Filed Dec. 27, 1967, Ser. No. 693,808
Claims priority, application Great Britain, Jan. 5, 1967, 768/67
Int. Cl. C03c 5/10, 1/02
U.S. Cl. 210—17                                12 Claims

ABSTRACT OF THE DISCLOSURE

Apparatus for the biological treatment of waste water containing organic matter comprising a combined settling and decomposition tank consisting of two interconnecting compartmets, a first compartment which is designed for the removal of dissolved or suspended matter by the action of micro-organisms and a second compartment for receiving solid organic matter deposited from the first compartment and so designed that gases produced therein are prevented from returning to the first compartment and in which a plurality of rotatable members are mounted in the first compartment and project above the working level of waste water therein so as to facilitate aerobic removal of dissolved or suspended matter.

---

Figure 1:
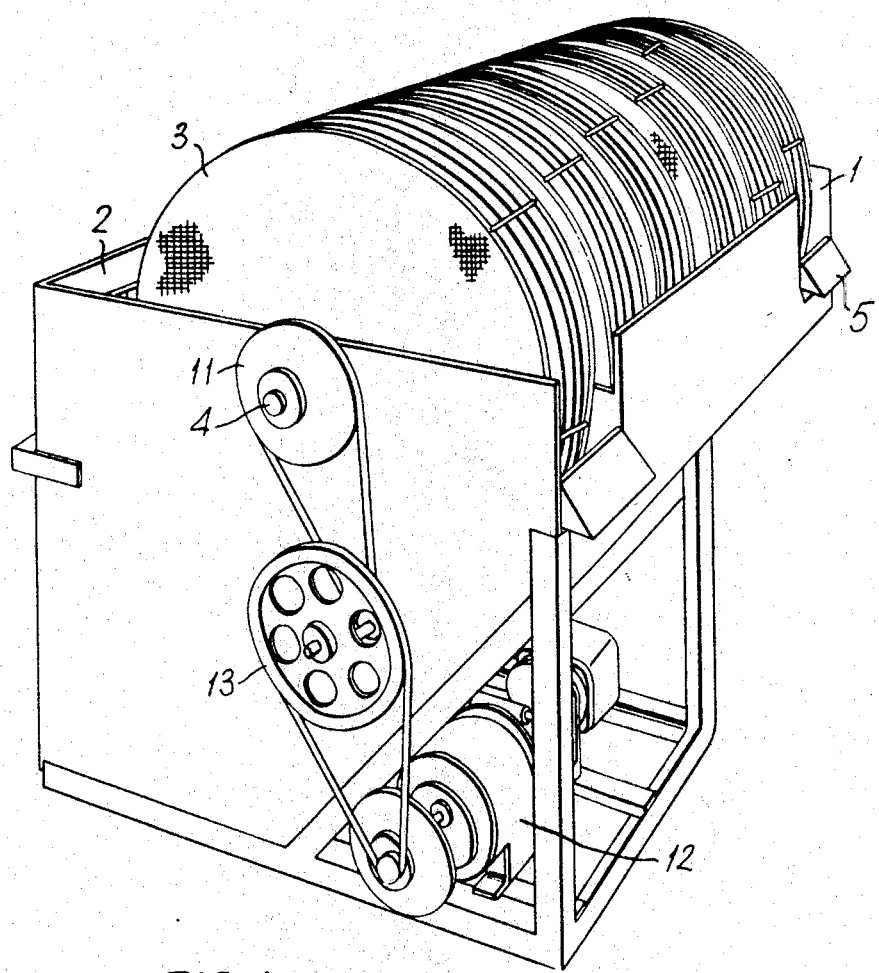

This invention relates to the biological treatment of waste water containing organic matter.

In the biological treatment of waste water containing organic matter settleable solids are allowed to settle out and decompose, and the waste water is then contacted with micro-organisms which feed upon the organic matter remaining in it and thus remove this matter from it. These micro-organisms require both nutrient and air. In one method which has been employed for bringing the waste water, the organisms and air into contact, the water is allowed to trickle through a bed of stones covered with a slime containing the micro-organisms. This has the disadvantages that a loss of hydraulic head occurs as the waste water passes through the bed and, if there is not a natural fall, hydraulic equipment must be used, and also that the bed occupies a large area of ground space. Alternatively air may be bubbled through a tank of waste water containing the organisms.

Biological treatment may also be carried out by partially immersing, in a tank containing waste water, members such as discs carrying micro-organisms on their surface and rotating them slowly so that the micro-organism come into contact with both the waste water and air. In processes of this type which have hitherto been operated, the waste water is first led through a settling tank and is then subjected to biological treatment and is then led through a second settling tank where he sludge formed during biological treatment is allowed to settle out. The apparatus involved required a large amount of ground space, and means must be provided for transferring waste water from one part of the apparatus to another. It has now been discovered that a biological treatment carried out in this way can be operated in such a manner that so little turbulence is created in the tank that the suspended solids are not prevented from settling out, and thus the first settling step, the biological treatment and the second settling step, may be all carried out in the same tank.

This results in a considerable saving of ground space and simplification of the lay-out of the processes and their operation. Since the apparatus according to the invention has a reduced number of conduits and other component parts for transferring waste water from one part of the apparatus to another, as compared with previous apparatus, it requires relatively little supervision. Further, since processes which were formerly carried out in at least three separate spaces are carried out in a single space the apparatus is less sensitive to change in the volume of flow of waste water to be treated and the biological treatment process takes advantages of the space and volume required for the settlement of solids and vice versa.

Thus, there is provided according to the present invention apparatus for the biological treatment of waste water containing organic matter comprising a combined settling and decomposition tank consisting of two interconnecting compartments, a first compartment which is designed for the removal of dissolved or suspended matter by the action of micro-organisms and a second compartment for receiving solid organic matter deposited from the first compartment and so designed that gases produced therein are prevented from returning to the first compartment and in which a plurality of rotatable members are mounted in the first compartment and project above the working level of waste water therein so as to facilitate aerobic removal of dissolved or suspended matter.

There is also provided according to the present invention a process for the biological treatment of waste water containing organic matter which comprises introducing the waste water into a combined settling and decomposition tank comprising two interconnecting compartments, a first compartment through which the liquid is traversed in a non-turbulent manner before discharging through an outlet, and a second compartment in which liquid flow conditions are substantially static and into which solid organic matter deposited in the first compartment can pass, but from which gases evolved in the second compartment cannot pass to the first compartment and removing dissolved or suspended matter from the waste water in the first compartment by the aerobic action of micro-organisms on rotatable members mounted in the first compartment which are rotated so that the micro-organisms are exposed alternately to the waste water and to the air.

The first and second compartments of the tank may be connected by means of a hole or holes opening from the bottom of the first compartment to a point part way up the second compartment and arranged so that gases arising from the bottom of the second compartment, where the solid matter is allowed to decompose, do not pass through the hole or holes in the first compartment but are, for example, allowed to escape to the atmosphere via a side channel. Thus the holes may be offset so that they are not situated directly above the bottom of the second compartment or suitable baffles may be provided below the hole or holes.

The tank may conveniently be in the form known as an Imhoff tank. That is the first compartment is situated above the second compartment, and is in the form of a trough having side walls of which the upper parts are vertical and the lower parts slope downwards and inwards but do not meet at the bottom, thus leaving a slit. One wall of the trough may be continuous with a wall of the second compartment, in which case that wall should continue to slope downwards below the slit, so that the bottom of the second compartment is off-set to one side of the slit. Alternatively both walls of the trough may be separate from the walls of the second compartment, in which case the sloping part of one of the walls of the trough should project beyond the slit so as to form a baffle to prevent rising gases and entrained sludge from entering the trough.

The rotatable members are preferably in the form of at least one set of discs mounted on a common axle. The discs may be solid or made of material such as woven mesh and are preferabiy constructed of a substance which will not corrode, for example, Perspex which is a trade name for an acrylic resin. The axle or axles are preferably above the surface of the waste water, but as near to it as is convenient so that a large portion of the discs is immersed. It may be desirable to prevent the film of micro-organisms on the discs from becoming too thick. This may be done by mechanical scraping or alternatively by periodically reversing the flow through the first compartment so that those organisms which had been receiving fresh waste received spent waste and become starved and drop off the disc. A convenient method of arranging for a mechanical cleaning of the discs is to use at least two overlapping sets of discs each set being mounted on a common axle and at least one set being movable so that the surfaces of the discs may be caused to scrape together when it is desired to clean them. In operation the discs are rotated slowly, for example at about one half to two revolutions per minute.

As the waste water flows through the apparatus, it should contact as many of the discs as possible and to achieve this the first compartment may be provided with baffles parallel to the plane of rotation of the rotatable members whereby the waste water is constrained to flow to and fro across the axis of rotation of the rotatable members. Thus the baffles may extend part way across the first compartment to divide it up into a number of sections each containing a group of discs. Thus each baffle may be attached to the wall at one side of the compartment but stop short of the opposite wall to leave a gap connecting the compartments on either side of the baffle, successive baffles being alternately connected to one side and the other of the compartment so that the waste water flowing in at one end of the compartment and out at the other follows a zig zag pattern and flows across the discs of each compartment in turn.

When the apparatus is in operation, waste water is caused to flow through the first compartment. The flow of the waste water may be controlled, for example, by means of adjustable weirs on its points of entrance to and exit from the apparatus. The rate of flow of this waste water and the rate of rotation of the rotatable members should be such that substantially no turbulence is caused. Normally the inlet and outlet for the waste water will be to and from the first compartment. However, when the water contains a high proportion of large suspended solids, it may be advantageous to feed the water initially into the second compartment so that the large solids settle out before the water passes into the first compartment, as otherwise they might clog the discs. In this case it will be necessary to provide a baffle extending across the second compartment to cause the waste water to flow upwards into the first compartment. This baffle may be an extension of the first of the baffles in the first compartment which are described above. Alternatively, the waste water may be fed into a section of the first compartment in which there are no discs, so that the large solids settle out before the waste water comes into contact with the discs.

It may sometimes be advantageous to recycle the water through the apparatus or to introduce waste water through more than one inlet.

As the waste water flows through the first compartment, the flow pattern should be such that substantially all the water remains in the first compartment and does not flow down into the second compartment, as this might result in waste water flowing directly from the inlet to the outlet through the second compartment and thus not contacting the organisms on the rotatable members during is passage through the apparatus. Thus the flow conditions in the second compartment should be substantially static. It may be advantageous to provide one or more baffles in the second compartment to reduce or minimise liquid flow therein. If the waste water has substantial kinetic energy on entering the first compartment, turbulence may be caused and a flow pattern may be set up whereby the water flows down into the second compartment. Thus it may be advantageous to provide suitable baffles to absorb the kinetic energy of the water.

As the waste water flows through the first compartment, suspended solids and biological sludge formed by the micro-organisms settle out under the action of gravity and pass into the second compartment where they accumulate and decompose to form gases and a sludge. If desired, removal of the sludge may be effected from time to time, for example, via a sump near the inlet end into which the sludge is pushed by a scraper moving along the bottom of the compartment, or by means of suction tubes, or by hydrostatic head.

The first compartment may, if desired, be cleaned periodically by attaching a scraper to the rotatable members to scrape the sides of the compartment.

If the apparatus is in the open-air the first compartment is preferably covered to prevent the rotatable members from being shaken by wind.

Figure 4:
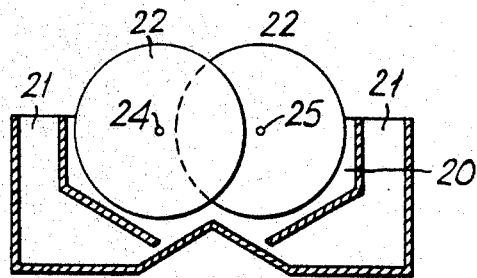
Figure 2:
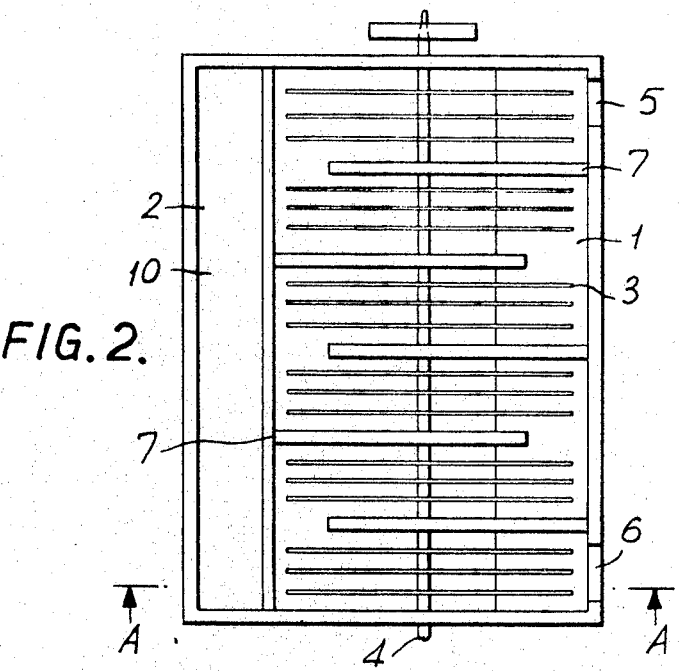
Figure 3:
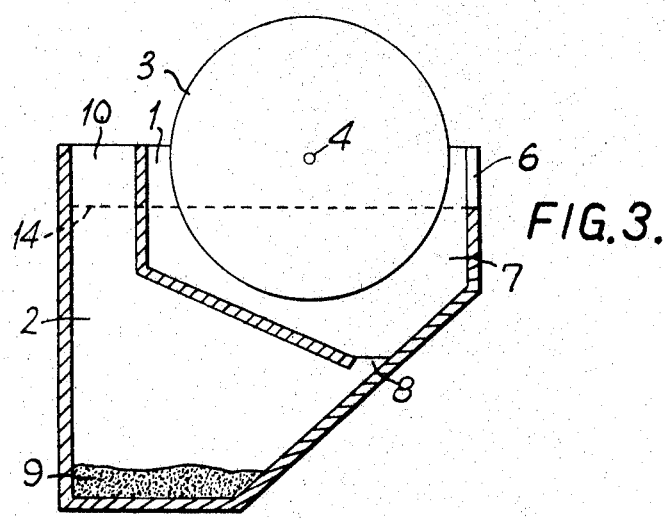

Specific embodiments of the invention will now be described with reference to the accompanying drawings of which FIGURE 1 is a perspective view of one embodiment, FIGURE 2 is a plan view and FIGURE 3 is a section view along the line A—A of the embodiment shown in FIGURE 1 and FIGURE 4 is a sectional view of another embodiment of the invention.

Referring to FIGURES 1–3, a tank has a first compartment 1 and a second compartment 2 arranged to form an Imhoff tank. In the first compartment 1 there are a plurality of discs 3 mounted on a common axle 4. Waste water flows into the compartment 1 over an adjustable weir 5, and flows out of the compartment 1 over an adjustable weir 6. The compartment 1 is divided into sections by baffles 7 so that waste water flowing through it is constrained to follow a zig-zag path. The compartment 1 is connected to the compartment 2 through a slit 8. Solid matter passing through the slit 8 collects at the bottom of comartment 2 at 9 and gases arising from this matter when it decomposes escape through the opening 10. The axle 4 carries a pulley-wheel 11 which is driven by a motor 12 via an idling pulley-wheel 13. The levle of the waste water is shown at 14.

Referring to FIGURE 4, a tank has a first compartment 20 and a second compartment 21 divided into two parts. In the first compartment 20 there are two overlapping sets of discs 22 and 23, each set mounted on a common axle respectively 24 and 25. The axle 24 is movable at right-angles to the plane of the figure so that the discs of the two sets 22 and 23 may be made to scrape against each other so that they are cleaned.

Table I shows results obtained using a prototype apparatus as shown in FIGURES 1–3 in which the discs are of radius 1 foot 6 inches and constructed of Netlon (a trade name for a synthetic nylon mesh material). The capacity of the first compartment is 200 gallons. There are a total of 36 discs and the first compartment is divided by baffles into six compartments, each containing six discs. The apparatus was fed with settled sewage and initially approximately 1,000 mg./l. per litre of sugar was added to the feed to afford a high biological oxygen demand and to help establish the growth on the discs. The results obtained using the sewage with sugar added are marked with an *. "BOD" stands for "Biological Oxygen Demand," and "DV" stands for "Dichromate Value" (a chemical oxygen demand test).

TABLE I

| Detention time, hr.: | Influent DV, mg./l. | Influent BOD, mg./l. | Effluent DV, mg./l., unfiltered | Effluent DV, mg./l., filtered | Effluent BOD, mg./l., unfiltered | Reduction in BOD percent |
|---|---|---|---|---|---|---|
| 7.5* | 1,920 | 1,410 | 360 | 220 | 240 | 83 |
| 7.5* | 1,760 | 1,280 | 330 | 210 | 210 | 85 |
| 7.5* | 1,890 | 1,370 | 370 | 180 | 248 | 82 |
| 7.5 | 390 | 238 | 150 | 110 | 49 | 80 |
| 7.5 | 425 | 278 | 190 | 130 | 57 | 80 |
| 7.5 | 700 | 520 | 220 | 165 | 71 | 86 |
| 7.5 | 480 | 220 | 130 | 95 | 36 | 84 |
| 7.5 | 520 | 270 | 102 | 88 | 48 | 82 |
| 15 | 590 | 250 | 110 | 95 | 45 | 82 |
| 15 | 534 | 265 | 109 | 97 | 45 | 83 |
| 15 | | 300 | | | 25 | 92 |

I claim:

1. Apparatus for the biological treatment of waste water containing organic matter comprising a combined settling and decomposition tank and consisting of first and second directly connected compartments, said first compartment being situated at least partly above said second compartment and having the function of the removal of dissolved or suspended matter from the waste water by the action of micro-organisms, said second compartment having the function of receiving solid organic matter deposited from the first compartment, said second compartment arranged in a manner that gases produced therein are prevented from returning to the first compartment, the bottom of the first compartment being partially open and in direct communication with said second compartment, and a plurality of rotatable members mounted in the first compartment and projecting above the working level of waste water therein so as to facilitate aerobic removal of dissolved or suspended matter.

2. Apparatus as claimed in claim 1, comprising adjustable weirs to control the flow of waste water through the apparatus.

3. Apparatus as claimed in claim 1, wherein the rotatable members comprise at least one set of discs mounted on a common axle.

4. Apparatus as claimed in claim 3, wherein the rotatable members comprise at least two overlapping sets of discs, each set being mounted on a common axle and at least one set being movable so that the surfaces of the discs may be caused to scrape together.

5. Apparatus as claimed in claim 1, wherein the first compartment is provided with baffles parallel to the plane of rotation of the rotatable members whereby the waste water is constrained to flow to and fro across the axis of rotation of the rotatable members.

6. Apparatus as claimed in claim 5, wherein the second compartment is provided with one or more baffles to reduce or minimise liquid flow therein.

7. Apparatus as claimed in claim 1 wherein the first and second compartments are connected by means of a hole or holes opening from the bottom of the first compartment to a point part-way up the second compartment and arranged so that gases arising from the bottom of the second compartment do not pass through the hole or holes into the first compartment.

8. Apparatus as claimed in claim 7, wherein the hole or holes are off-set so that they are not situated directly above the bottom of the second compartment.

9. Apparatus as claimed in claim 7, wherein baffles are provided below the hole or holes.

10. A process for the biological treatment of waste water containing organic matter which comprises introducing waste water into a combined settling and decomposition tank having first and second directly connected compartments, the said first compartment being situated at least partly above said second compartment, the bottom of the first compartment being partially open and in direct communication with said second compartment, flowing the waste water through the said first compartment in a nonturbulent manner nad discharging the clarified water through an outlet, removing dissolved or suspended matter from the waste water in the first compartment by the aerobic action of micro-organisms on rotatable members mounted in the first compartment, which members are rotated so that the micro-organisms are exposed alternately to the waste water and to the air, passing into the said second compartment through the said partially open bottom of the first compartment solid organic matter deposited in the first compartment, said second compartment being arranged so that gases evolved in the second compartment cannot pass to the first compartment and arranged so that flow conditions in the second compartment are substantially static.

11. A process as claimed in claim 10 wherein the waste water is fed into the first compartment and withdrawn from the first compartment.

12. A process as claimed in claim 10, wherein the waste water is fed into a section of the second compartment from which it is caused by a suitable baffle to flow into the first compartment and is withdrawn from the first compartment.

References Cited

UNITED STATES PATENTS

| 978,889 | 12/1910 | Imhoff | 210—195 X |
| 2,337,384 | 12/1943 | Gould | 210—7 |
| 2,889,929 | 6/1959 | Knell | 210—261 X |
| 3,335,081 | 8/1967 | El-Naggar | 210—17 |

FOREIGN PATENTS 1,324,936  3/1963  France.

MICHAEL E. ROGERS, Primary Examiner

U.S. Cl. X.R.

210—151, 261